United States Patent Office 3,398,043
Patented Aug. 20, 1968

3,398,043
METHOD OF BONDING SILICONE ELASTOMERS TO ORGANIC ELASTOMERS AND PRODUCT THEREOF
Delmar C. Youngs, Midland, Mich., assignor to Dow Corning Corporation, Midland, Mich., a corporation of Michigan
No Drawing. Filed July 1, 1965, Ser. No. 468,960
10 Claims. (Cl. 161—190)

ABSTRACT OF THE DISCLOSURE

Silicone elastomers are bonded to organic elastomers through an intermediate layer comprising a mixture of an organic isocyanate and a room temperature vulcanizable silicone elastomer stock.

---

The present invention relates to a method of bonding silicone elastomers to organic elastomers and to the products made by this process. Particularly, this invention relates to a method of bonding silicone elastomers to neoprene and the products made thereby.

Silicone elastomers are known for their release characteristics and for their resistance to bonding with organic polymers. Thus, silicone elastomers are difficult to bond to organic substrates, such as organic elastomers, and many primers and methods have been suggested by the prior art. With all these methods for bonding silicone elastomers to organic substrates, there is still not a useful method for bonding silicone elastomers to neoprene.

It is an object of this invention to provide a method of bonding silicone elastomers to organic elastomers, particularly neoprene. Another object of this invention is to provide an article of manufacture comprising bonded silicone elastomers and organic elastomers, particularly neoprene.

This invention relates to a method of bonding a silicone elastomer surface to an organic elastomer surface comprising (I) mixing
 (A) an organic isocyanate in an amount of from 20 to 80 weight percent, with
 (B) a room temperature vulcanizable silicone elastomer stock in an amount of from 20 to 80 weight percent to form a bonding mixture, weight percentages of (A) and (B) being based on the total weight of (A) and (B),
(II) applying the bonding mixture obtained from (I) to at least one of said surfaces,
(III) bringing said surfaces together with the bonding mixture therebetween, and thereafter
(IV) holding said surfaces in a sandwiched position until the bonding mixture cures.

The silicone elastomer surface can be a surface of any conventional silicone elastomer which has been vulcanized by conventional methods. The silicone elastomers are well known in the art and can be prepared and vulcanized by any known method, such as described in Warrick patents, U.S. Nos. 2,541,137, 2,560,498, 2,568,672, 2,718,512, and 2,728,743; Hyde patent, U.S. No. 2,571,039; Maneri patents, U.S. Nos. 2,658,882 and 3,137,670; Dickmann patents, U.S. Nos. 2,721,757, 2,803,619 and 2,819,236; Talcott patents U.S. Nos. 2,759,904 and 2,999,076; Koch patent, U.S. No. 2,833,742; Tyler patent, U.S. No. 2,863,846; Kongle et al. patent, U.S. No. 2,890,188; Chipman patent, U.S. No. 2,902,467; Polmanteer patent, U.S. No. 2,927,-907; Joyce patent, U.S. No. 2,956,032; Page et al. patent, No. 2,983,695; Fenner patent, U.S. No. 3,024,214; Bruner patents, U.S. Nos. 3,035,016, 3,070,555 and 3,077,465; Daudt patent, U.S. No. 3,036,985; Polmanteer et al. patent, U.S. No. 3,050,492; Collings patent, U.S. No. 3,061,-565; Russell patent, U.S. No. 3,061,575; Metevia patent, U.S. No. 3,070,560; Polmanteer et al. patent, U.S. No. 3,086,954; Haluska patent, U.S. No. 3,109,013; Brown et al. patent, U.S. No. 3,122,522; Weyenberg patent, U.S. No. 3,175,993; Brown et al. patent, U.S. No. 3,170,894; and Brown patent, U.S. No. 3,179,619. A silicone elastomer in this invention is understood to be any conventional silicone elastomer which is in the vulcanized state, which has been vulcanized by any conventional technique and which is in a solid or foam state.

The organic elastomer surface can be a surface of any natural or synthetic organic elastomer such as natural rubber such as balata and gutta-percha and hevea; butadiene-styrene copolymers; butadiene-acrylonitrile copolymers; isobutylene diolefin copolymers; alkylene polysulfides; polychloroprenes (neoprenes); nitrile rubbers; polyisoprene rubbers; acrylic rubbers such as polyethyl acrylate, copolymers of ethylacrylate and 2-chloroethyl vinylether and copolymers of acrylates and acrylonitrile; polyester rubbers such as copolymers of polyesters such as ethylene glycol, 1,2-propylene glycol or 1,4-butanediol and adipic acid and diisocyanates such as 1,5-naphthylene diisocyanate and copolymers of polyester amides such as copolymers of ethylene glycol, monoethanolamine and adipic acid and a diisocyanate such as hexamethylene diisocyanate; a rubber prepared from chlorinated polyethylene which is reacted with sulfur dioxide and then with metallic oxides, accelerators and organic acids (known as Hypalon S-2 and manufactured by Du Pont); a rubber made from a plasticized copolymer of vinylidene chloride (known as Saran and manufactured by The Dow Chemical Company); copolymers of butadiene and vinylpyridine and a rubber made from 1H, 1H-perfluoroalkylacrylates. Although any of the organic elastomers can be bonded to silicone elastomers by the method of this invention, the advantageous property of this invention is that those organic elastomers, such as neoprene, which were heretofore difficult to bond to silicone elastomers can now be bonded with ease.

The organic isocyanate (A) can be any organic isocyanate including organic monoisocyanates, organic diisocyanates, organic triisocyanates and polymeric organic isocyanates. Examples of operative organic isocyanates are toluene-2,4-diisocyanate,
toluene-2,6-diisocyanate,
metaphenylene diisocyanate,
4-chloro-1,3-phenylene diisocyanate,
4,4'-biphenyldiisocyanate,
1,5-naphthylene diisocyanate,
1,4-tetramethylene diisocyanate,
1,10-decamethylene diisocyanate,
1,4-cyclohexylene diisocyanate,
diphenylmethane-4,4'-diisocyanate,
ethylene diisocyanate,
ethylidene diisocyanate,
propylene-1,2-diisocyanate,
cyclohexylene-1,2-diisocyanate,
3,3'-dimethylbiphenylene-4,4'-diisocyanate,
3,3'-dimethoxybiphenylene-4,4'-diisocyanate,
3,3'-diphenylbiphenylene-4,4'-diisocyanate,
3,3'-dichlorobiphenylene-4,4'-diisocyanate,
triphenylene-p,p',p"-triisocyanate,
furfurylidene diisocyanate,
benzene triisocyanate,
hexane-1,2,6-triisocyanate,

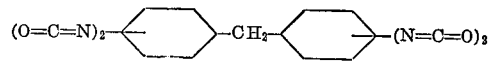

benzene isocyanate, butaneisocyanate, the adducts of polyisocyanates to alcohols which still have free isocyanate groups such as trimethylol propane, glycerine, hexane triol, glycols or lower polyesters such as castor oil, reaction products of excess diisocyanate with a polyhydric alcohol such as

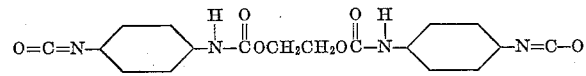

and

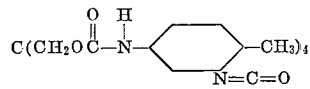

polymeric organic isocyanates which contain unreacted isocyanate groups of any of the above, organosilicon isocyanates in which the isocyanate groups are bonded to the organic radicals such as

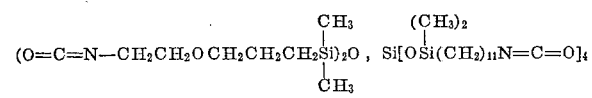

and other isocyanates as disclosed in U.S. Patent No. 3,170,891, by John L. Speier and isocyanates such as

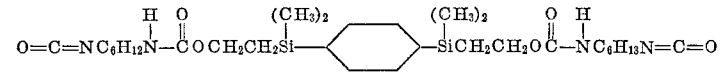

and

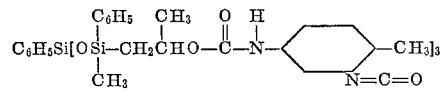

and other isocyanates as disclosed in U.S. Patent No. 3,179,622 by Loren A. Haluska and isocyanates such as

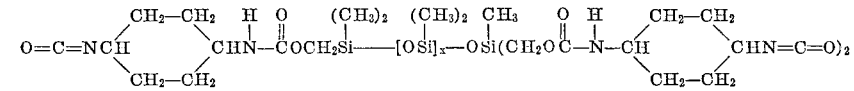

where $x$ is an integer. These isocyanates and others are well known in the art and most can be obtained commercially. It is preferred that the organic isocyanates have an average of at least two isocyanate groups per molecule.

The room temperature vulcanizable silicone elastomer stocks of this invention can be any of the conventional room temperature vulcanizable silicone elastomer stocks. The room temperature vulcanizable silicone elastomer stocks can be either of two package or one package type. The one package type is preferred.

One of the most preferred room temperature vulcanizable silicone elastomer stocks is a composition of the formula

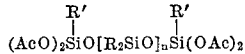

in which Ac is a saturated aliphatic monoacyl radical, R and R′ are monovalent hydrocarbon radicals, halogenated monovalent hydrocarbon radicals or cyanoalkyl radicals and $n$ is an integer of at least 5. The above compositions are prepared by reacting at least one mole of an acyloxy silane of the formula R′Si(OAc)$_3$ per silicon-bonded hydroxyl of hydroxylated siloxanes of the formula HO[R$_2$SiO]$_n$H. The reaction between the acyloxy silane and the hydroxylated siloxane occurs spontaneously upon mixing. For practical operation it is best to employ more than one mole of acyloxy silane per silicon-bonded hydroxyl. These compositions can also contain fillers and additives. Additional descriptions of the composition and preparation can be found in U.S. Patent No. 3,035,016 by Leonard B. Bruner which is hereby fully incorporated by reference.

Another preferred composition is the reaction product of a hydroxylated siloxane of the formula

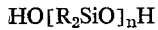

a silane of the formula R′Si(OAc)$_3$ in an amount such that there is at least 0.33 mole of silane per mole of silicon-bonded hydroxyl group in the hydroxylated siloxane and magnesium oxide in an amount such that there are at least 1.5 mols of oxide per mole of silane. Ac, R, R′ and $n$ are defined above. Upon mixing the above three ingredients, the reaction occurs spontaneously. Additional materials can be added such as fillers, plasticizers, oxidation inhibitors, etc. Additional details are described in U.S. Patent No. 3,061,575 by James R. Russell which is hereby fully incorporated by reference.

Another preferred composition is the composition as described in U.S. Patent No. 3,035,016 by Leonard B. Bruner and shown above with from 0.001 to 10 percent by weight of a carboxylic acid salt of a metal ranging from lead to manganese inclusive in the electromotive series of metals. Details and further description can be found in U.S. Patent No. 3,077,465 by Leonard B. Bruner, which is hereby fully incorporated by reference.

Another preferred room temperature vulcanizable silicone elastomer stock is a composition of the formula

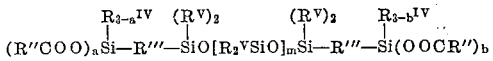

in which $R^{IV}$ and $R^V$ can be monovalent hydrocarbon radicals free of aliphatic unsaturation, halogenated monovalent hydrocarbon radicals free of aliphatic unsaturation or cyanoalkyl radicals, R″ is a hydrogen atom or an alkyl radical, R‴ is a divalent hydrocarbon radical free of aliphatic unsaturation, $a$ and $b$ are each positive integers from 1 to 3, preferably 2, the sum of $a$ and $b$ is at least 3 and $m$ is a positive integer. These compositions can be prepared by reacting silanes of the formulae (R″COO)$_3$SiH or (R″COO)$_2$R$^{IV}$SiH with compounds of the formula A[R$_2^V$SiO]$_{n-1}$SiR$_2^V$A where A is a monovalent hydrocarbon radical containing one aliphatic double bond. Alternatively, silanes of the formulae (R″COO)$_3$SiA or (R″COO)$_2$R$^{IV}$SiA can be reacted with compounds of the formula H[R$_2^V$SiO]$_{n-1}$SiR$_2^V$H. The reaction is carried out in the presence of a platinum catalyst. Filler, catalyst and other additives can be added to these compositions. Additional details and description can be found in U.S. Patent No. 3,109,013 by Loren A. Haluska which is hereby fully incorporated by reference.

Other room temperature vulcanizable silicone elastomer stocks operable in this invention are the hydrocarboxy containing composition. These compositions include for example compositions by Koch, U.S. Patent No. 2,833,742 in which an acid-free organopolysiloxane of at least 1 cs. viscosity at 25° C., the siloxane having a formula

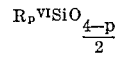

where $R^{VI}$ is a monovalent hydrocarbon radical or a halogenated monovalent hydrocarbon radical and $p$ is from 1.99–2 inclusive, an alkylpolysilicate in which the alkyl groups have less than 6 carbon atoms in an amount from 0.1 to 50 percent by weight based on the weight of the organopolysiloxane and a condensation product of an aliphatic aldehyde and an aliphatic primary amine both having less than 8 carbon atoms in an amount from 0.01–10 percent by weight based on the weight of the organopolysiloxane. Fillers and other additives can also be incorporated into this composition.

Another example of an operable composition is by Chipman, U.S. Patent No. 2,902,467. This composition is a mixture of an organopolysiloxane of at least 100 cs.

viscosity at 25° C., having silicon-bonded hydroxyl groups and units of the formula $$R_p^{VI}\text{—SiO}_{\frac{4-p}{2}}$$

where $R^{VI}$ and $p$ are defined above, silicates of the formula $R_{4-q}^{VII}Si(OCH_2CH_2OR^{VIII})_q$ in which $R^{VII}$ is a monovalent hydrocarbon radical or halogenohydrocarbon radical both of less than 7 carbon atoms, $R^{VIII}$ is a monovalent aliphatic hydrocarbon radical of less than 6 carbon atoms and $q$ is from 3 to 4 or partial hydrolyzates of $R_{4-q}^{VII}Si(OCH_2CH_2OR^{VIII})_q$ in an amount from 0.2 to 10 percent by weight and a carboxylic acid salt of metals ranging above hydrogen in the electromotive series of metals in an amount from 0.01 to 10 percent by weight based on the weight of the organopolysiloxane. Fillers and other additives can be included in the composition. Other compositions are described in U.S. Patent No. 2,927,907 by Keith E. Polmanteer and U.S. Patent No. 2,983,694 by Nigel Page and John Tudor.

Compositions described by Paul L. Brown and James Franklin Hyde in U.S. Patent No. 3,122,522 are operative. The compositions comprise an organopolysiloxane which consists essentially of at least two units of the formula $$[R^{VI}(OCH_2CH_2)_cO]_d\overset{R_e^{VI}}{\underset{|}{Si}}Z\text{—}\overset{R_2^{VI}}{\underset{|}{Si}}O_{0.5}$$

and units of the formula $$R_fSiO_{\frac{4-f}{2}}$$

in which $R^{VI}$ is defined above, $d$ is 2 to 3, $e$ is 0 to 1, the sum of $d+e$ has a maximum of 3 per unit, $c$ is 1 to 3, $f$ is 0 to 2 and $Z$ is a divalent hydrocarbon radical from 2 to 18 inclusive carbon atoms and being free of aliphatic unsaturation, there being from 1.3 to 2.0 $R^{VI}$ per silicon atom and at least seven units of $$R_fSiO_{\frac{4-f}{2}}$$

per molecule. Fillers and other additives can be added. Other compositions are described in U.S. Patent No. 3,170,894 by Paul L. Brown and James Franklin Hyde.

An example of another operable room temperature vulcanizable silicone elastomer stock is a composition described by Donald R. Weyenberg in U.S. Patent No. 3,175,993. The composition comprises a polymer of the formula $$\overset{R_y^{IX}}{\underset{|}{Si}}[(OSi)_v\overset{R_2^{IX}}{\underset{|}{Z}}Si(OR^X)_g]_{4-y}^{R_{3-g}^{IX}}$$

in which $R^{IX}$ is a monovalent hydrocarbon and halohydrocarbon free of aliphatic unsaturation and monovalent cyanoalkyl radicals, $Z$ is defined above, $R^X$ is an alkyl or haloalkyl radical of less than 5 carbon atoms, $y$ is 0 to 2, $v$ is at least 3 and $g$ is 2 to 3.

Other room temperature vulcanizable silicone elastomer stocks can be found in U.S. Patent Nos. 3,065,194; 3,070,566; 3,109,826; 3,110,689; 3,127,363; 3,133,891; 3,154,515; 3,165,494; and 3,189,576.

The method of bonding a silicone elastomer surface to an organic elastomer surface comprises first mixing from 20 to 80 weight percent of an organic isocyanate with from 20 to 80 weight percent of a room temperature vulcanizable silicone elastomer stock. The weight percentages are based on the total weight of the organic isocyanate and the room temperature vulcanizable silicone elastomer stock. Preferably, from 20 to 40 weight percent of the organic isocyanate is mixed with from 60 to 80 weight percent of the room temperature vulcanizable silicone elastomer stock. The two ingredients are thoroughly mixed by any conventional means to prepare a bonding mixture and it is preferred that the mixing is done in the absence of moisture and that the mixture is stored in the absence of moisture. Keeping the mixing step and the final mixture anhydrous is not critical if the mixture is intended to be used in a short time. The mixture is then applied to either a silicone elastomer surface, to an organic elastomer surface or to both surfaces. The mixture can be applied in any conventional manner such as by spreading, dipping and calendering. The surface coated with the bonding mixture and the surface not coated are brought together so that the bonding mixture is between them. It is important that the two surfaces are the surfaces of dissimilar materials when brought together namely one surface is a silicone elastomer and the other surface is an organic elastomer. Both a surface of a silicone elastomer and a surface of an organic elastomer can be coated with the bonding mixture and then the two coated surfaces brought together. Once the two surfaces are brought together, they are held in this position until the bonding mixture has cured to a solid, elastic material. To hold the surfaces together with the bonding mixture therebetween, a sandwiched or laminated position, an external force can be used such as by clamps, by hand, or by gravity. Some bonding mixtures will be adhesive enough to hold the two surfaces in position without any external force.

This invention also relates to an article of manufacture consisting essentially of a silicone elastomer and an organic elastomer, a surface of the silicone elastomer facing a surface of the organic elastomer, said surfaces being bonded in position by a cured bonding mixture therebetween, consisting essentially of, in the unvulcanized state, (A) an organic isocyanate and (B) a room temperature vulcanizable silicone elastomer stock, (A) being present in an amount of from 20 to 80 weight percent based on the weight of (A) and (B) and (B) being present in an amount of from 20 to 80 weight percent based on the weight of (A) and (B).

The structure and the shape of the silicone elastomer and the organic elastomer are not critical. The surfaces must be adjacent to be bonded. The amount of bonding mixture required is not critical in that any amount which is economically feasible is operative. The bonding mixture itself is elastic and thus large and small amounts can be used. Also irregular surface can be bonded in that the bonding mixture will fill the irregularities with an elastomeric material when cured.

The advantages of this invention are that silicone elastomers which could not be readily bonded to various organic elastomers, such as neoprene, can now readily be bonded to an unlimited number of organic elastomers including neoprene. The bonding can be done at room temperature and without presses or other special tools. Although this invention does not require special equipment for preparing the bonded elastomers, it does not preclude their use. The silicone elastomer-bonding mixture-organic elastomer can be advantageously made by using a press and heating to temperatures up to 300° C. The bond strength is increased by this technique and the curing time of the bonding mixture is greatly reduced.

The sandwiched structure of this invention can be used on rollers which come into contact with hot materials, such as the rollers used in applying hot plastics to paper, steel, etc. to deposit a film thereon. Such rollers are made with the silicone rubber as the outer surface to provide a surface which is heat resistant and does not become brittle over a period of time and to which hot plastics will not adhere. The sandwiched structure can be used in any place where release and heat resistance is desired on one surface.

The following examples are illustrative only and should not be construed as limiting the present invention.

Example 1.—A bonding mixture was prepared by thoroughly mixing 30 weight percent of 4,4′-diphenylmethane diisocyanate (31.3 weight percent isocyanate groups) with 70 weight percent of a room temperature vulcanizable silicone elastomer stock composed of 100 parts by weight of a hydroxyl endblocked polydimethylsiloxane having a viscosity of about 4,000 cs. at 25° C., 31.5 parts by weight of a trimethylsilyl treated silica, 40 parts by weight of a hydroxyl endblocked polydimethylsiloxane having a viscosity of 1,000 cs. at 25° C., 6 parts by weight of TiO$_2$ and 9.25 parts by weight of monomethyltriacetoxysilane. The bonding mixture was spread evenly, about 0.035 inch thick, over a surface of a neoprene sheet and a vulcanized polydimethylsiloxane elastomer sheet was placed over the bonding mixture. The sandwiched assembly was pressed firmly together by hand and allowed to stand for 16 hours at room temperature to permit the bonding mixture to cure. The bond strength was then determined by a peel test as described in Military Specification, "Cement: General Purpose Synthetic Base," MIL–C–4003 (USAF) October 5, 1949, paragraph 4.5.1.1. The materials were tested by stripping back at an angle of 180 degrees. A testing machine, such as a Scott Tester, having a jaw separation rate of two inches per minute was used. The first and last inch of the specimen was not used. An average adhesion of 3.2 pounds per inch was obtained.

Example 2.—A vulcanized polydimethylsiloxane elastomer was bonded to neoprene as described in Example 1, except the bonding mixture was 33.3 weight percent of the diisocyanate and 66.7 weight percent of the room temperature vulcanizable silicone elastomer stock. The adhesion was equivalent to that obtained in Example 1.

Example 3.—When the following bonding mixtures are prepared by thoroughly mixing and are used to bond a vulcanized polydimethylsiloxane elastomer to neoprene, equivalent results are obtained when prepared and tested as described in Example 1. Parts are parts by weight.

(A)

20 parts of toluene-2,4-diisocyanate,
80 parts of a room temperature vulcanizable silicone elastomer stock having the average formula

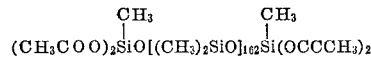

(B)

25 parts of 1,4-tetramethylene diisocyanate,
75 parts of a room temperature vulcanizable silicone elastomer stock having the average formula

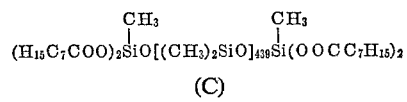

(C)

50 parts of 1,5-naphthylene diisocyanate,
50 parts of a room temperature vulcanizable silicone elastomer stock composed of a mixture of 100 parts of a 10,000 cs. at 25° C. hydroxy-endblocked dimethylpolysiloxane, 10 parts of methyltriacetoxysilane, 40 parts of 1000 cs. (at 25° C.) trimethylsiloxy-endblocked dimethylpolysiloxane, 14 parts of a fume silica and 0.25 part of dibutyltin diacetate.

(D)

60 parts of a partially polymerized 1,4-cyclohexylene diisocyanate having 25 weight percent isocyanate groups,
40 parts of a room temperature vulcanizable silicone elastomer stock having an average formula

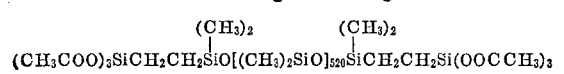

(E)

35 parts of propylene-1,2-diisocyanate,
65 parts of a room temperature vulcanizable silicone elastomer stock composed of a mixture of 100 parts of a dimethylpolysiloxane gum, 40 parts of a finely divided silica filler, 3 parts of ethylpolysilicate and 1 part of the condensation product of ethylamine and formaldehyde.

(F)

55 parts of 3,3'-dimethoxybiphenylene-4,4'-diisocyanate,
45 parts of a room temperature vulcanizable silicone elastomer composed of a mixture of 100 parts of a hydroxy-endblocked dimethylpolysiloxane fluid having a viscosity of 15,000 cs. at 25° C., 30 parts of diatomaceous earth, 0.5 part of lead octoate and 1.5 parts of ethylpolysilicate.

(G)

45 parts of triphenylene-p,p',p''-triisocyanate,
55 parts of a room temperature vulcanizable silicone elastomer stock composed of 100 parts of a non-flowing benzene soluble dimethylpolysiloxane, 50 parts diatomaceous earth, 5 parts of a devolatilized ethylpolysilicate and 0.5 part of dibutyltin diacetate.

(H)

5 parts of butane isocyanate,
25 parts of

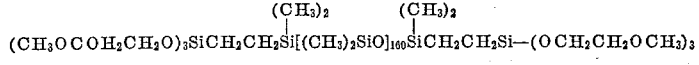

70 parts of a room temperature vulcanizable silicone elastomer stock composed of 100 parts of a dimethylpolysiloxane gum, 68 parts of diatomaceous earth, 2 parts of a mixture of 1 part dibutyltin dilaurate and 3 parts of ethylpolysilicate.

(I)

70 parts of the adduct of furfurylidene diisocyanate and trimethylolpropane,
30 parts of a room temperature vulcanizable silicone elastomer stock having an average formula

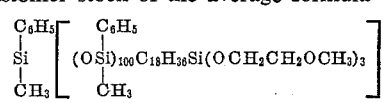

and being catalyzed with a di-n-hexylamine.

(J)

40 parts of

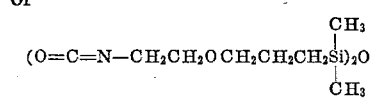

60 parts of a room temperature vulcanizable silicone elastomer stock of the average formula

and catalyzed with dibutyltin dilaurate.

(K)

80 parts of $$(O=C=N-CH_2CH_2OCH_2CH_2\underset{\underset{CH_3}{|}}{\overset{\overset{CH_3}{|}}{Si}})_2O$$

20 parts of a room temperature vulcanizable silicone elastomer stock composed of 100 parts of a siloxane of the average formula (CH$_3$OCH$_2$CH$_2$O)$_3$SiO[(CH$_3$)$_2$SiO]$_{723}$Si(OCH$_2$CH$_2$OCH$_3$)$_3$ 40 parts of a 1000 cs. at 25° C. trimethylsiloxy-endblocked dimethylpolysiloxane, 25 parts of a high surface area silica xerogel and 2.5 parts of di-n-hexylamine.

(L)

75 parts of

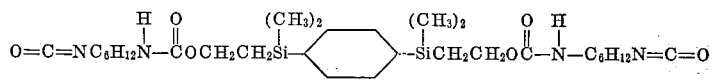

25 parts of a room temperature vulcanizable silicone elastomer stock composed of a mixture of 100 parts of a siloxane of the average formula

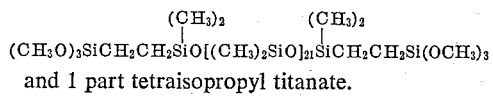

and 1 part tetraisopropyl titanate.

(M)

80 parts of

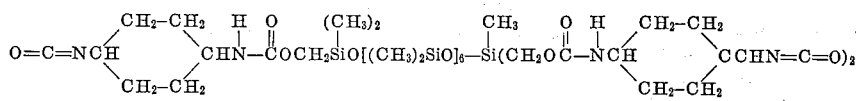

20 parts of a room temperature vulcanizable silicone elastomer stock composed of a mixture of 100 parts of a hydroxyl endblocked dimethylsiloxane polymer of 16,500 cs. at 25° C., 50 parts of quartz flour and a mixture of 0.5 part ethylorthosilicate and 0.2 part dibutyltin dilaurate.

(N)

10 parts of toluene-2,6-diisocyanate,
20 parts of a partially polymerized metaphenylene diisocyanate having 15 weight percent isocyanate groups,
70 parts of a room temperature vulcanizable silicone elastomer stock composed of a mixture of 100 parts hydroxy-endblocked dimethylpolysiloxane having a viscosity of 28,000 cs. at 25° C., 5 parts of bistriethoxysilethane and 2 parts tin octoate (28% tin).

(O)

20 parts of 4,4'-biphenyldiisocyanate,
25 parts of 1,10-decamethylene diisocyanate,
30 parts of partially polymerized ethylene diisocyanate having 25 weight percent isocyanate groups,
25 parts of a room temperature vulcanizable silicone elastomer stock composed of a mixture of 100 parts of a hydroxyl-endblocked dimethylpolysiloxane having a viscosity of 28,000 cs. at 25° C., 5 parts of polyvinyltriethoxysilane and 2 parts of tin octoate (28% tin).

(P)

20 parts of diphenylmethane-4,4'-diisocyanate,
80 parts of a room temperature vulcanizable silicone elastomer stock composed of a mixture of 100 parts of a dimethylpolysiloxane having a molecular weight of 500,000, 70 parts of calcined diatomaceous earth, 10 parts of a methylsilicone resin having 5% ethoxy groups and 1.5 parts of dibutyltin dilaurate.

(Q)

5 parts of ethylidene diisocyanate,
20 parts of cyclohexylene-1,2-diisocyanate,
5 parts of benzene triisocyanate,
5 parts of benzene isocyanate,
65 parts of a room temperature vulcanizable silicone elastomer stock composed of a mixture of 100 parts of a dimethylpolysiloxane having a viscosity of 300 cs. at 25° C., 50 parts of siliceous chalk, 10 parts of phenyltributoxysilane and 5 parts of lead oxide.

(R)

30 parts of 3,3'-dimethylbiphenylene-4,4'-diisocyanate,
70 parts of a room temperature vulcanizable silicone elastomer stock composed of 100 parts of a mixture of 100 parts of a dimethylpolysiloxane having a viscosity of 30,000 cs. at 25° C., and 50 parts of calcined diatomaceous earth, 100 parts of a mixture of 70 parts of polyvinyl chloride, 25 parts of diamyl phthalate and 5 parts of dibutyltin dilaurate and 40 parts of a methylhydrogenpolysiloxane having a viscosity of 150 cs. at 25° C.

(S)

20 parts of 3,3'-diphenylbiphenylene-4,4'-diisocyanate,
20 parts of 3,3'-dichlorobiphenylene-4,4'-diisocyanate,
60 parts of a room temperature vulcanizable silicone elastomer stock composed of a mixture of 100 parts of a hydroxyl endblocked dimethylpolysiloxane having a viscosity of 21,000 cs. at 25° C. and having 0.15 weight percent silicon-bonded hydroxyl groups and 3 parts of methyltriacetoxysilane.

(T)

45 parts of

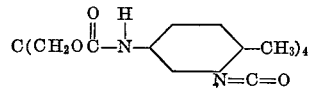

5 parts of

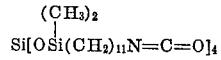

50 parts of a room temperature vulcanizable silicone elastomer stock composed of a mixture of 100 parts of a hydroxyl endblocked dimethylpolysiloxane having a viscosity of 2,000 cs. at 25° C., 20 parts of diatomaceous earth, 20 parts zinc oxide, 30 parts of calcined clay, 2 parts of a partially hydrolyzed ethylorthosilicate, 2 parts of tin octoate in mineral spirits (6% tin) and 20 parts of chlorinated polyphenyl comprising a mixture of chlorinated diphenyls, chlorinated terphenyls and chlorinated higher polyphenyls having an average of 48 percent by weight chlorine.

(U)

33 parts of diphenylmethane,4,4'-diisocyanate,
67 parts of a room temperature vulcanizable silicone elastomer stock composed of a mixture of 100 parts of a dimethylpolysiloxane endblocked with

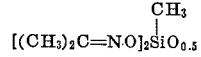

having a viscosity of 1200 cs. at 25° C. and 25 parts of a silica filler.

(V)

75 parts of a polymerized diphenylmethane-4,4'-diisocyanate having 5 weight percent isocyanate groups,
25 parts of a room temperature vulcanizable silicone elastomer stock of the average formula

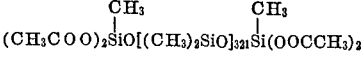

Example 4.—When a vulcanized methylvinylpolysiloxane elastomer, a vulcanized phenylmethylpolysiloxane elastomer or a vulcanized ethylmethylpolysiloxane elastomer replaces the vulcanized dimethylpolysiloxane elastomer of Example 3, equivalent results are obtained.

Example 5.—When a polyisoprene rubber, a nitrile rubber, a natural rubber, a butadiene-styrene rubber, a polyethylacrylate rubber and a butadiene-acrylonitrile rubber replace the neoprene of Example 3, equivalent results are obtained.

Example 6.—When the following bonding mixtures are prepared by thoroughly mixing and are used to bond a vulcanized 3,3,3-trifluoropropylmethylpolysiloxane elastomer to neoprene, equivalent results are obtained when prepared and tested as described in Example 1. Parts are parts by weight.

(A)

40 parts of a partially polymerized hexane-1,2,6-triisocyanate having 28 weight percent isocyanate groups,
60 parts of a room temperature vulcanizable silicone elastomer stock of the average formula

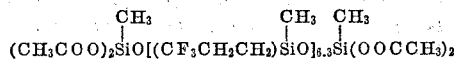

(B)

30 parts of 4-chloro-1,3-phenylene diisocyanate,
70 parts of a room temperature vulcanizable silicone elastomer stock composed of a mixture of 95.6 parts of a composition of 100 parts of a hydroxy-endblocked 3,3,3-trifluoropropylmethylpolysiloxane having a viscosity of 35,000 cs. at 25° C. and about 0.17% by weight silicon-bonded hydroxyl groups, 15 parts of a 1000 cs. at 25° C. trimethylsiloxy-endblocked 3,3,3-trifluoropropylmethylpolysiloxane and 15 parts of a hydrophobed reinforcing silica filler, 4.4 parts of methyltriacetoxysilane and 10 parts of magnesium oxide.

(C)

60 parts of

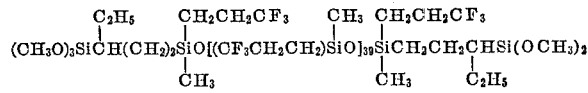

40 parts of a room temperature vulcanizable silicone elastomer stock composed of a mixture of 100 parts of a siloxane of the average formula

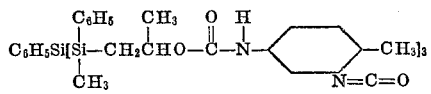

and 1 part of tetraisopropyltitanate.

Example 7.—When a vinylidene chloride rubber (Saran), a rubber made from 1H,1H-perfluoropropyl acrylate, polyethyl acrylate rubber or natural rubber replace the neoprene of Example 6, equivalent results are obtained.

Example 8.—When the bonding mixture of Example 6(A) is spread in a thin layer onto a surface of a neoprene sheet and onto a surface of a 3,3,3-trifluoropropylmethylsiloxane elastomer sheet and the surfaces so treated are brought together in a press and then heated to 150° C. for 4 hours, the sandwiched construction becomes one elastomeric sheet with one outer surface neoprene and the other a siloxane elastomer.

That which is claimed is:

1. A method of bonding a silicone elastomer surface to an organic elastomer surface comprising
   (I) mixing
      (A) an organic isocyanate in an amount of from 20 to 80 weight percent with
      (B) a room temperature vulcanizable silicone elastomer stock in an amount of from 20 to 80 weight percent to form a bonding mixture, weight percentages of (A) and (B) being based on the total weight of (A) and (B),
   (II) applying the bonding mixture obtained from (I) to at least one of said surfaces,
   (III) bringing said surfaces together with the bonding mixture therebetween, and thereafter
   (IV) holding said surfaces in a sandwiched position until the bonding mixture cures.

2. The method according to claim 1 in which (A) is present in an amount from 20 to 40 weight percent and (B) is present in an amount from 60 to 80 weight percent.

3. The method according to claim 1 in which said surfaces are held in a sandwiched position by clamps.

4. The method according to claim 1 in which said surfaces are held in a sandwiched position by a press and thereafter heated to cure said bonding mixture.

5. The method according to claim 2 in which the organic isocyanate is diphenylmethane-4,4'-diisocyanate, the room temperature vulcanizable silicone elastomer stock consists essentially of a hydroxyl endblocked polydimethylsiloxane, a silica filler and monomethyltriacetoxysilane and the organic elastomer surface is a neoprene surface.

6. An article of manufacture consisting essentially of a silicone elastomer and an organic elastomer, a surface of the silicone elastomer facing a surface of the organic elastomer, said surfaces being bonded in position by a cured bonding mixture therebetween, consisting essentially of, in the unvulcanized state, (A) an organic isocyanate and (B) a room temperature vulcanizable silicone elastomer stock, (A) being present in an amount of from 20 to 80 weight percent based on the weight of (A) and (B) and (B) being present in an amount of from 20 to 80 weight percent based on the weight of (A) and (B).

7. The article of manufacture of claim 6 in which (A) is present in an amount of 20 to 40 weight percent and (B) is present in an amount of from 60 to 80 weight percent.

8. The article of manufacture of claim 6 in which the organic elastomer is neoprene.

9. The article of manufacture of claim 7 in which the organic elastomer is neoprene.

10. The article of manufacture of claim 7 in which the bonding mixture in the unvulcanized state consists essentially of (A) 4,4'-diphenylmethane diisocyanate and (B) a hydroxyl endblocked polydimethylsiloxane, a silica filler and monomethyltriacetoxysilane.

References Cited

UNITED STATES PATENTS 3,278,333    10/1966    Titzmann _____ 117—138.8

EARL M. BERGERT, *Primary Examiner.*

W. E. HOAG, *Assistant Examiner.*